(12) United States Patent
Chen et al.

(10) Patent No.: US 11,357,245 B2
(45) Date of Patent: Jun. 14, 2022

(54) APPARATUS AND METHOD FOR PREPARING A FOOD PUREE

(71) Applicant: KONINKLIJKE PHILIPS N.V., Eindhoven (NL)

(72) Inventors: Huangli Chen, Shanghai (CN); Qiao Hua, Deyang (CN); Yafang Jin, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/614,847

(22) PCT Filed: Jun. 18, 2018

(86) PCT No.: PCT/EP2018/066147
§ 371 (c)(1),
(2) Date: Nov. 19, 2019

(87) PCT Pub. No.: WO2018/234252
PCT Pub. Date: Dec. 27, 2018

(65) Prior Publication Data
US 2020/0178583 A1    Jun. 11, 2020

(30) Foreign Application Priority Data

Jun. 21, 2017   (WO) ................ PCT/CN2017/089333
Jul. 17, 2017   (EP) ..................................... 17181579

(51) Int. Cl.
*A23L 19/00*       (2016.01)
*A23L 5/10*        (2016.01)
(Continued)

(52) U.S. Cl.
CPC ................ *A23L 19/09* (2016.08); *A23L 5/13* (2016.08); *A47J 19/04* (2013.01); *A47J 27/04* (2013.01);
(Continued)

(58) Field of Classification Search
CPC ...... A47J 27/04; A47J 36/32; A47J 2027/043; A47J 43/04; A47J 43/0761; A23L 5/13;
(Continued)

(56) References Cited

U.S. PATENT DOCUMENTS 5,442,997 A * 8/1995 Branz ..................... A47J 27/16
                                                    366/101
7,794,134 B1 * 9/2010 Henry .................. A23N 17/005
                                                    366/138
(Continued)

FOREIGN PATENT DOCUMENTS

CN         202287744 U  *  7/2012
EP         2273904         10/2012
(Continued)

OTHER PUBLICATIONS

"Steam cooking baby food: why is it good for them" cookingbabyfood.com Mar. 27, 2014 https://web.archive.org/web/20161028082231/https://www.cookingbabyfood.com/dossiersalimentation/steam-cooking-baby-food-why-is-it-good-for-them/ (Year: 2014).*
(Continued)

*Primary Examiner* — Erik Kashnikow
*Assistant Examiner* — Austin Parker Taylor

(57) ABSTRACT

Provided is an apparatus (100) for preparing a food puree comprising a chamber (102) for containing food ingredients and a steam supply (104) for supplying steam to the chamber for steaming the food ingredients. A liquid supply (106) supplies a liquid to the chamber and an agitator (108) purees the steamed food ingredients in the presence of the liquid to obtain the food puree. A user interface (110) permits user selection of a texture of the food puree. A controller determines a steam parameter and a liquid amount to be supplied by the liquid supply according to the user selection. The controller further controls the steam supply and the liquid supply according to the determined steam parameter and
(Continued)

liquid amount. Further provided is a method for preparing the food puree.

18 Claims, 4 Drawing Sheets

(51) Int. Cl.
*A47J 19/04* (2006.01)
*A47J 27/04* (2006.01)
*A47J 36/32* (2006.01)

(52) U.S. Cl.
CPC .......... *A47J 36/32* (2013.01); *A23V 2002/00* (2013.01); *A47J 2027/043* (2013.01)

(58) Field of Classification Search
CPC .......... A23L 19/09; A23L 33/40; A23L 19/13; A23L 25/30; B01F 7/00; B01F 15/00123; B01F 15/04; B01F 15/06
USPC ........... 99/353; 126/369; 426/510, 511, 518, 426/519
See application file for complete search history.

(56) References Cited

U.S. PATENT DOCUMENTS

| | | | |
|---|---|---|---|
| 2006/0108433 A1* | 5/2006 | Fossati | F24C 15/327 236/44 C |
| 2007/0283814 A1* | 12/2007 | Thom | A23K 40/10 99/277 |
| 2010/0193528 A1* | 8/2010 | Davidson | A47J 39/00 220/573.1 |
| 2010/0255168 A1* | 10/2010 | Roth | A23L 5/13 426/510 |
| 2011/0086151 A1 | 4/2011 | Plattner | |
| 2012/0211521 A1 | 8/2012 | Moeggenberg | |
| 2013/0032038 A1* | 2/2013 | Lee | A47J 27/04 99/348 |
| 2013/0202760 A1* | 8/2013 | Holcomb | A47J 27/06 426/510 |
| 2014/0083305 A1 | 3/2014 | Lin | |
| 2014/0109774 A1* | 4/2014 | Fukumori | A47J 27/04 99/330 |
| 2015/0017299 A1* | 1/2015 | Hibi | A23L 5/13 426/510 |
| 2015/0237897 A1 | 8/2015 | Sands | |

FOREIGN PATENT DOCUMENTS

| | | | |
|---|---|---|---|
| GB | 2449870 | | 12/2008 |
| GB | 2493447 | | 2/2013 |
| JP | 2004245540 | A * | 9/2004 |
| JP | 2014083240 | A * | 5/2014 |
| TW | 201701807 | | 1/2017 |
| WO | 2013/035029 | | 3/2013 |
| WO | 2016/096445 | | 6/2016 |

OTHER PUBLICATIONS

Alberta Health Services "Preparing Texture Modified Foods: A Training Program for Supportive Living Sites" Nutrition and Food Services 2015 https://www.albertahealthservices.ca/assets/info/nutrition/if-nfs-slides-preparing-texture-modified-foods-a-training-program-for-supportive-living-sites.pdf (Year: 2015).*
Eat Fresh "Pear Puree (Baby Food)" Mar. 1, 2015 https://web.archive.org/web/20150301221505/https://eatfresh.org/recipe/pear-puree-baby-food (Year: 2015).*
Yamada-Hosley, Heather "Sweat Vegetables Before Making Soup for a Smoother, Creamier Texture" Mar. 9, 2015 https://lifehacker.com/sweat-vegetables-before-making-soup-for-a-smoother-cre-1690220197 (Year: 2015).*
International Search Report and Written Opinion dated Aug. 21, 2018 For International Application No. PCT/EP2018/066147 Filed Jun. 18, 2018.

* cited by examiner

APPARATUS AND METHOD FOR PREPARING A FOOD PUREE

CROSS REFERENCE TO RELATED APPLICATIONS

This application is the U.S. National Phase application under 35 U.S.C. § 371 of International Application No. PCT/EP2018/066147 filed Jun. 18, 2018, published as WO 2018/234252 on Dec. 27, 2018, which claims the benefit of European Patent Application Number 17181579.8 filed Jul. 17, 2017 and Patent Application Number PCT/CN2017/089333 filed Jun. 21, 2017. These applications are hereby incorporated by reference herein.

FIELD OF THE INVENTION

This invention relates to an apparatus and method for preparing a food puree.

BACKGROUND OF THE INVENTION

Nutrition during the first thousand days of early life is critical to growth and development. In particular, physical growth, mental development, and immune function development are all heavily dependent on nutrition during this key period. Infant weaning, also referred to as complementary feeding, takes place during this period. Infant weaning involves introduction of foods such as rice, vegetables, fruit and meat to the infant's diet.

Such food tends to be in the form of a puree such that it can be safely and more easily consumed by the infant. The texture of the puree varies according to the age of the infant. This is due to factors such as dental development, jaw muscle development etc. As the infant grows, the texture of the puree may transition from smoother to coarser, i.e. lumpier, textures. The moisture content of the food may also gradually change from higher to lower moisture contents as the infant develops.

Food purees are also important sources of nutrition for the elderly and other individuals who may be suffering oral or digestive ill-health. Controlling the texture of such purees according to the individual requirements of such persons is an important goal.

Devices for preparing food purees are known. Such devices may steam food ingredients prior to blending the cooked ingredients to the desired puree. In such conventional devices, a smooth puree which is, for instance, suitable for younger infants tends to be achieved by simply employing longer steaming times.

Prolonged steaming of the food ingredients may, however, result in greater depletion of nutrients from the food ingredients. It is known that nutrients such as vitamin C, B-vitamins and some functional phytochemicals are sensitive to heat such that prolonged exposure of food ingredients to high temperatures, i.e. during steaming, can result in depletion of such nutrients. Accordingly, individuals requiring a smoother puree (e.g. younger infants) may be deprived of the nutrients which are removed from the food ingredients in order to attain the requisite smooth texture. This is particularly undesirable in view of the aforementioned importance of good nutrition in the early days of life.

SUMMARY OF THE INVENTION

The present invention seeks to provide an apparatus and method for preparing a food puree which address at least some of the abovementioned problems.

As mentioned in the background, the longer steaming time helps to make the food puree to smoother. However, the inventor of the present application found that after a certain period of steaming, the softness of the steamed food will keep stable. Afterwards, continuously steaming mainly results in increased water condensate content in the steamed food, which assists in affording a smoother puree following blending of the cooked food ingredients with this water. By this observation, the inventor designs the method and apparatus to shorten the cooking time and result in a similar food puree texture.

The invention is defined by the claims.

According to an aspect of the present invention there is provided an apparatus for preparing a food puree comprising: a chamber for containing food ingredients; a steam supply for supplying steam to the chamber for steaming the food ingredients; a liquid supply for supplying a liquid to the chamber; an agitator for pureeing the food ingredients to obtain the food puree; a user interface adapted to receive data related to a texture requirement of the food puree; and a controller adapted to determine according to said received data, at least one steam parameter based on which the steam is to be supplied and a liquid amount to be supplied by the liquid supply, the controller being further adapted to control the steam supply and liquid supply according to the determined at least one steam parameter and liquid amount.

The present invention provides an apparatus in which a controller controls both the at least one steam parameter and the supply of a liquid to the food ingredients. In this manner, the requisite softness and liquid content of the food for attaining a smooth texture food puree, i.e. which may be suitable for younger infants, may be realized without the need for prolonged steaming. The obviation of prolonged steaming in order to attain such a smooth texture may mean that the food puree may retain more nutrients.

A user interface receives data related to a texture requirement from a user and the controller determines the at least one steam parameter and the liquid amount according to the received, i.e. user-inputted, data. The controller further controls the steam supply and the liquid supply according to the determined at least one steam parameter and liquid amount such that the apparatus provides a food puree having the requisite texture. In this way, the user interface permits the user to determine, i.e. select, the desired texture of the food puree, such that the apparatus may prepare a food puree which is tailored to the requirements of the consumer of the puree.

In an embodiment, the at least one steam parameter is selected from a steaming time, a steam volume, a steam pressure and a power supplied to the steam supply.

The apparatus may comprise a timer for timing a steaming time, the controller being adapted to control the steaming time. More prolonged steaming corresponds to a greater steam amount being supplied to the chamber. Thus controlling the steaming time provides a convenient means of controlling the cooking conditions and the amount of moisture, i.e. water condensate, added to the food ingredients during steaming.

The apparatus may comprise a weight sensor adapted to provide an indication of an increase in weight of the food ingredients during or following the steaming, wherein the controller is adapted to control the at least one steam parameter and/or the liquid amount in response to the indication.

Determining the amount of moisture added to the food ingredients during steaming may be more accurately determined using the weight sensor than, for instance, using the steaming time alone. By having a more accurate determination of the amount of moisture added during steaming, i.e. by determining the difference between the respective weights of the food ingredients before and after steaming, a more reliable estimation of the liquid amount required to be added to the food ingredients to attain the desired texture may be made. Accordingly, the weight sensor may permit greater control to be exercised over the texture of the food puree.

The controller may be further adapted to control the agitator according to the received data. The texture, i.e. smoothness, of the food puree may be influenced by the manner in which the agitator effects mechanical breakdown of the food ingredients. Thus by the controller further controlling the agitator according to the puree texture requirement inputted by the user, the capability of the apparatus to tailor the texture of the food puree according to the requirements of the consumer of the puree may be enhanced.

The agitator may comprise a rotor and the controller may be adapted to control the rotational speed of the rotor according to the received data. The greater the rotational speed of the rotor, the smoother the texture of the puree will tend to be. Thus by the controller further controlling the rotational speed of the rotor, the controller may exercise a greater degree of control over the texture of the food puree.

The chamber may comprise a perforate wall portion having at least one aperture, the perforate wall portion being coupled to the steam supply such that the steam enters the chamber via the at least one aperture. The supply of steam via the at least one aperture, e.g. via a plurality of apertures, of the perforate wall portion may assist to distribute the steam within the chamber thereby to facilitate contacting of the steam with the food ingredients. Cooking of the food ingredients may thus be made more efficient.

The steam supply may comprise a one way valve through which steam is supplied into the chamber. The one way valve may assist to prevent ingress of condensed water and food ingredients into the steam supply. Thus better control may be exerted over the moisture content of the food ingredients delivered during steaming. Moreover, retention of nutrients inside the chamber may be assisted by preventing their removal along with the water condensate.

The liquid supply may comprise a liquid reservoir for storing the liquid. The liquid supply may further comprise a pump with the controller being adapted to control the pump to pump the liquid amount from the liquid reservoir to the chamber.

The apparatus may comprise a heating element arranged to heat the liquid in the liquid reservoir according to the determined at least one steam parameter such that steam is generated when the liquid comprises water, the liquid reservoir having a steam outlet which couples to the steam supply. By virtue of the liquid reservoir storing water both for the steam supply and the liquid supply, the design of the apparatus may be simplified. The heating element may further supply heat to the liquid such that, for instance, addition of warmed liquid to the steamed food ingredients may assist to avoid rapid cooling of the cooked ingredients upon supplying of the liquid to the chamber.

The controller may comprise: a database module having a database of pre-stored data correlating the at least one steam parameter, the liquid amount and the texture requirement; and a control module adapted to determine the at least one steam parameter and the liquid amount according to the pre-stored data.

The data related to a texture requirement may comprise at least one of: a texture descriptor; and an age of a food puree consumer. The texture descriptor may provide a user-friendly means for the user to select the desired texture of the food puree. The age of the food puree consumer may alternatively or additionally be used to select the desired texture of the food puree. Younger infants require a smoother puree than older infants. Thus, for instance, by inputting the infant age, the apparatus may prepare a food puree having a texture which is appropriate for the age of the infant.

The controller may be adapted to determine the at least one steam parameter and liquid amount according to a food descriptor, wherein the food descriptor defines at least one of a food type, a food shape, a food size, and a food weight, the user interface being adapted to receive data related to the food descriptor. Such food descriptors may assist in determining the most appropriate conditions for preparing a food puree using a particular food ingredient or combination of food ingredients. User selection of the food descriptor may thus result in a food puree having the requisite taste and texture.

According to a further aspect of the present invention there is provided a method of preparing a food puree comprising: receiving data related to a texture requirement of the food puree; determining a steam parameter and a liquid amount according to the received data; supplying steam to a chamber containing food ingredients according to the determined steam parameter; supplying a liquid to the chamber according to the determined liquid amount; and pureeing the steamed food ingredients in the presence of the liquid amount. The supplying of the liquid may be in addition to water condensed in the chamber during the supplying steam to the chamber.

Since the steam parameter and liquid amount are determined according to the food ingredients and their amount that are initially placed in the chamber, it is preferred that no further ingredients are added, at least until the puree has been prepared fully.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
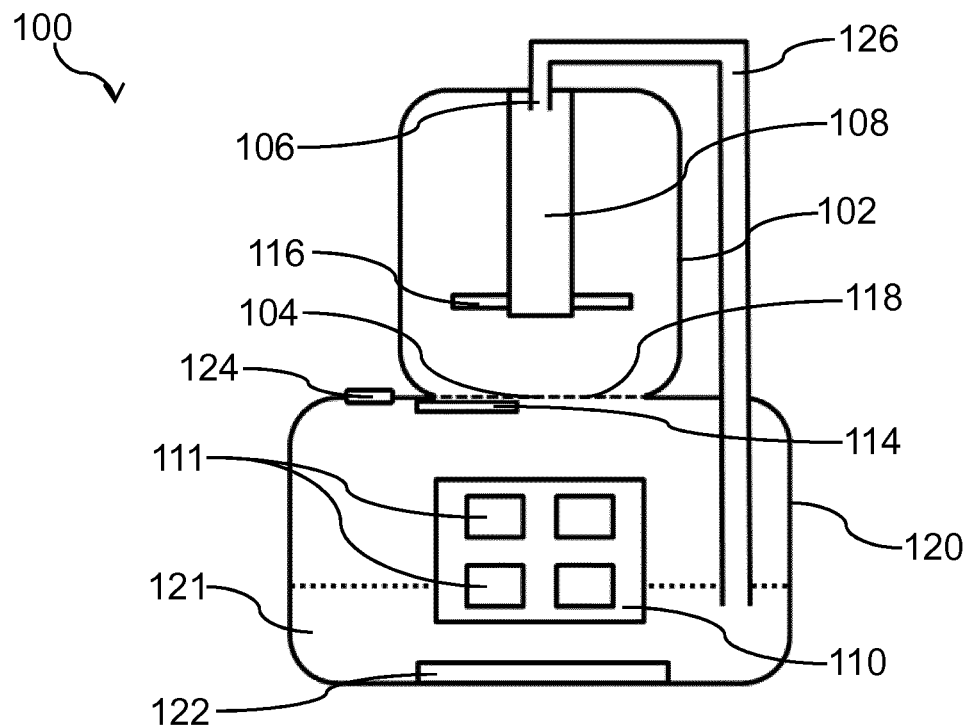
FIG. 1 schematically depicts an apparatus according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is an apparatus for preparing a food puree comprising a chamber for containing food ingredients and a steam supply for supplying steam to the chamber for steaming the food ingredients. A liquid supply supplies a liquid to the chamber and an agitator purees the steamed food ingredients in the presence of the liquid to obtain the food puree. A user interface permits user selection of a texture of the food puree. A controller determines a steam parameter and a liquid amount to be supplied by the liquid supply according to the user selection. The controller further controls the steam supply and the liquid supply according to the determined steam parameter and liquid amount.

Conventional devices for preparing food purees employ prolonged steaming in order for the food ingredients to be cooked to a very soft texture. The prolonged steaming results in a longer heating period which assists in achieving greater softening of the food during the cooking process. Moreover, prolonged steaming results in increased water condensate content in the steamed food, which assists in affording a smoother puree following blending of the cooked food ingredients with this water.

The present invention is based on the realisation that attaining a smooth textured food puree need not require prolonged steaming of the food ingredients. By controlling the at least one steam parameter and an amount of additional liquid supplied to the food ingredients, a smooth texture of the food puree may be attained without excessive steaming thereby avoiding unnecessary stripping or depletion of nutrients from the food ingredients. Accordingly, younger infants or patients requiring a smooth food puree having a high moisture content may not be deprived of nutrients due to excessive steaming.

FIG. 1 schematically depicts an apparatus 100 for preparing a food puree according to an embodiment. The apparatus 100 comprises a chamber 102 for containing food ingredients (not shown). A steam supply 104 supplies steam to the chamber 102 in order to cook the food ingredients contained within the chamber 102. Steam may be supplied to the chamber 102 by any suitable means. In the non-limiting example shown in FIG. 1, the steam supply 104 is integral to the apparatus 100. A liquid reservoir 120 holds water 121 which is heated by the heating element 122 thereby to vaporise the water 121 to steam. The heating element 122 may be any suitable heating element such as an electrical heating element in which heat is generated by passing current through suitable, e.g. coiled, filament.

The steam may be supplied to the chamber 102 via the perforate portion 118 of the chamber 102. The term 'perforate' in this context may mean that the perforate portion 118 includes one or a plurality of apertures. As shown in FIG. 1, the perforate portion 118 may comprise a plurality of apertures through which the steam may enter the chamber 102. By supplying the steam through the perforate portion 118 in this manner, distribution of the steam within the chamber 102 may be facilitated. Contacting of the steam with the food ingredients, and therefore cooking of the food ingredients, may thus be made more efficient. Whilst the perforate portion 118 as shown in FIG. 1 is included in the bottom wall of the chamber 102, i.e. on which the food ingredients may be placed, this is not intended to be limiting. The perforate portion 118 may equally be on the sidewalls or the uppermost wall of the chamber 102. Alternative steam inlet designs, i.e. which may not incorporate such a perforate portion 118, are also conceivable.

In an embodiment, the steam supply 104 may comprise a one way valve (not shown) through which steam is supplied into the chamber 102. The one way valve may assist to prevent ingress of condensed water and food ingredients into the steam supply 104. Thus better control may be exerted over the moisture content of the food ingredients by virtue of one way valve assisting to limit or prevent water condensate escaping from the chamber 102 via the steam supply 104. Moreover, retention of nutrients inside the chamber 102 may be assisted by preventing their removal from the chamber 102 along with the water condensate.

Whilst not shown in FIG. 1, the chamber 102 may further comprise one or more steam exits such that unwanted pressure may not build up in the chamber 102 during steaming of the food ingredients.

The water 121 in the liquid reservoir 120 may be replenished via the connection point 124. The connection point 124 may, for instance, be connected to a mains water supply. This connection point 124 may also be used for the attachment of a pump (not shown) to the liquid reservoir 120, as will be described in more detail later in relation to the liquid supply 106. Whilst the steam supply 104 is depicted in FIG. 1 as being integral to the apparatus 100, it is equally conceivable that the steam supply 104 may be a separate steam generator unit which is coupled to the chamber 102 when steam is required to cook the food ingredients.

The apparatus 100 comprises an agitator 108 for pureeing, i.e. blending, the food ingredients so as to prepare the puree. Any suitable agitator 108 may be employed for this purpose. In an embodiment, the agitator 108 comprises a rotor 116 which rotates in order to effect mechanical breakdown of the food ingredients. The rotor 116 may comprise a rotatable paddle or blade for crushing and/or cutting the food ingredients, as is well-known per se.

The apparatus 100 includes a liquid supply 106 for supplying a liquid to the chamber 102. In the non-limiting example shown in FIG. 1, the liquid supply 106 supplies water 121 from the liquid reservoir 120 to the chamber 102 via the tube 126. Owing to the liquid supply 106 and the steam supply 104 having a common water reservoir 120, heated by the heating element 122, the design of the apparatus 100 may be simplified. Moreover, the heating element 122 may further supply heat, e.g. residual heat following supply of steam, to the water 121 in the reservoir 120 such that, on addition of the warmed liquid to the steamed food ingredients, rapid cooling of the cooked food ingredients may be avoided. This may be beneficial in scenarios when it is desired to consume the food puree immediately following its preparation.

Whilst the liquid supply 106 is depicted in FIG. 1 as connecting to an uppermost wall of the chamber 102, this is not intended to be limiting. The liquid supply 106 may alternatively or additionally connect to one or more of the sidewalls and bottom wall of the chamber 102.

A pump (not shown) may be connected to the reservoir 120 such that water 121 may be pumped from the reservoir 120 into the chamber 102. The pump may, for instance, be connected to the reservoir 120 via the connection point 124. Alternatively, the pump may be integral to the apparatus 100. By, for instance, the pump increasing the pressure in the reservoir 120, water 121 may be forced into the chamber 102 via the tube 126.

Alternatively, the liquid supply 106 and the steam supply 104 may be separate. The liquid supply 106 may, for instance, supply a liquid other than water to the chamber 102. For example, the liquid may be milk, fruit juice, vegetable juice etc. The choice of the liquid may, for instance, depend on the recipe being used in the preparation of the food puree.

In another non-limiting example, the liquid supply 106 may be employed to supply water condensate which has escaped from the chamber 102 during and/or following the steaming of the food ingredients back into the chamber 102. In this manner, the nutrients contained in such condensed water may be re-added to the food ingredients, such that the food puree may be rendered more nutritious. It is noted for the avoidance of doubt that this re-addition via the liquid supply 106 is controlled by the controller 112 thereby obviating manual intervention by the user.

It is noted at this point that the apparatus 100 shown in FIG. 1 may permit both pureeing and steaming of the food ingredients without the requirement to switch the configuration of the apparatus 100 from a steaming configuration to a pureeing configuration. However, this is not intended to be limiting and it is equally conceivable that the apparatus 100 may require adjustment between steaming and blending and/or liquid addition, e.g. by removal of the agitator 108 and attachment of the liquid supply 106 and/or steam supply 104. Such an adjustment may, for instance, be achieved by the chamber 102 comprising suitable engagement members located on opposite ends of the chamber 102. Inverting the chamber 102 and engaging it with the relevant component (steam supply 104, agitator 108 and/or liquid supply 106) thus permits switching of the configuration of the apparatus 100. This means of switching the apparatus 100 between a steaming configuration and a pureeing configuration is well-known per se and will not be further described herein for the sake of brevity only.

In an embodiment, the apparatus 100 may comprise a weight sensor 114 for providing an indication of an increase in weight of the food ingredients during and/or following the steaming. The weight sensor 114 may, for instance, permit the difference between the respective weights of the chamber 102 before and after steaming to be determined. In this manner, a more reliable estimation of the liquid amount required to be added to the food ingredients to attain the desired texture may be made.

The apparatus 100 comprises a user interface 110 for receiving data related to a texture requirement of the food puree. In other words, the user interface 110 enables user-input of the desired texture of the food puree. In the non-limiting example shown in FIG. 1, the user interface 110 comprises buttons 111 which may be pushed by the user in order to select the desired texture of the food puree. However, any suitable user interface 110 may be employed for this purpose, such as a rotating dial, a touchscreen etc.

In an embodiment, the data related to a texture requirement comprises at least one of a texture descriptor and an age of the food puree consumer. The user interface 110 may enable the user to select the texture of the food puree by making a selection from one or more texture descriptors, e.g. 'very smooth', 'medium smooth', 'slightly coarse', 'very coarse'. As will be readily apparent to the skilled person, such texture descriptors may alternatively or additionally be represented pictorially. The selection may involve pushing one or more buttons 111, rotating a dial, selecting from a touchscreen menu etc.

Alternatively or additionally, the user interface 110 may enable the user to select the texture of the food puree by entering the age of the food puree consumer. This may, for instance, be achieved by pushing 'up' and 'down' buttons, rotating a dial etc. in order to input the consumer's age. Young infants tend to require a smoother food puree than older infants due to the differences in dental and jaw muscle development. Accordingly, inputting the infant age via the user interface 110 may permit the apparatus 100 to prepare a food puree having a texture which is appropriate, i.e. tailored, according to the age of the infant.

Further user interface 110 options will be immediately apparent to the skilled person which may facilitate making a choice of the food puree texture via the user interface 110 according to the needs of the consumer of the food puree, e.g. a patient or elderly consumer.

In an embodiment, the user interface 110 is operable to receive data related to a food descriptor. The food descriptor may be, for instance, one or more of a food type, shape, size, and weight. Different food types, shapes, sizes and weights will require different cooking and pureeing protocols. Therefore entry or selection of a food descriptor using the user interface 110 may assist the user to control the apparatus 100 such that a food puree having the desired taste and texture is prepared.

Alternatively or additionally, the apparatus 100 may comprise a sensor system (not shown) for detecting food related information, e.g. the food descriptor. Such a sensor system may, for instance, comprise a camera arranged to monitor the inside of the chamber 102, thereby to obtain images of the food ingredients contained within the chamber 102. In such a non-limiting example, the controller 112 may be adapted to interpret the images, e.g. using image processing techniques, in order to detect the food related information.

Figure 2:
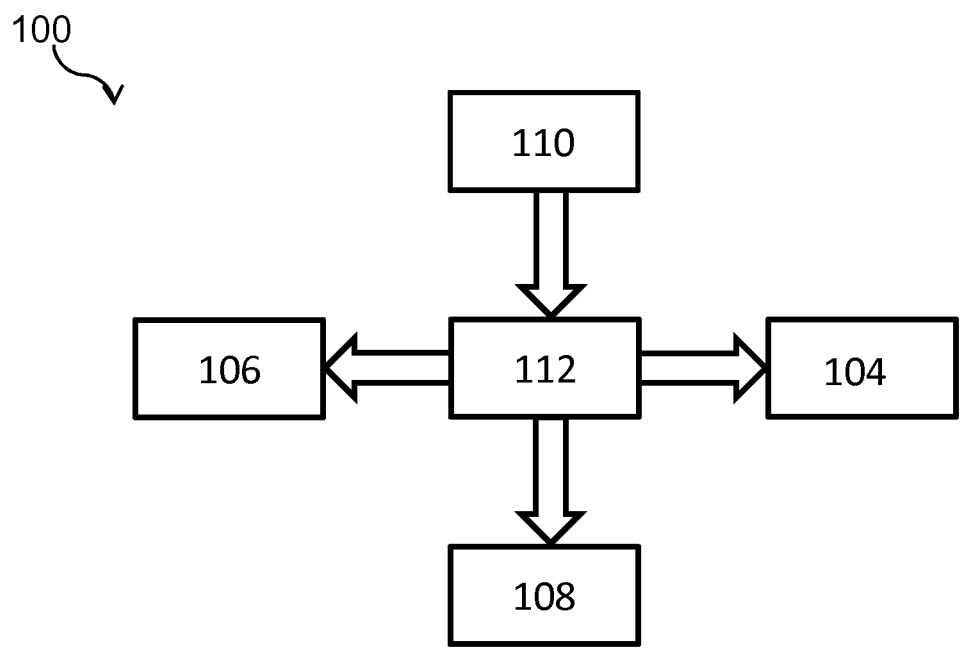
FIG. 2 shows a block diagram of an apparatus according to an embodiment.

Turning to FIG. 2, a block diagram is shown of the apparatus 100. The user interface 110, which receives the texture requirement-related data which is input by the user, supplies this information to the controller 112. This is depicted by the arrow connecting the respective user interface 110 and controller 112 blocks.

The controller 112 determines the steam parameter according to the received data from the user interface 110. The controller 112 further controls the steam supply 104 according to the determined steam parameter. In other words, the controller 112 may, for instance, control the steam amount supplied by the steam supply 104 according to the user selected texture of the food puree.

The steam parameter may be selected from a steaming time, a steam volume, a steam pressure, and a power supplied to the steam supply 104. Controlling one or more of these parameters may thus determine, for instance, the steam amount which is supplied to the chamber 102. Clearly, a longer steaming time will result in greater softening of the food ingredients and an increased steam amount being supplied to the chamber 102. Similarly, a higher steam pressure and/or volume will also correspond to greater steam amount. Increased power supplied, e.g. to the heating element 122, of the steam supply 104 may result in increased quantities of water 121 being vaporised and thus a greater quantity of steam being supplied into the chamber 102.

In an embodiment, the apparatus 100 may comprise a timer (not shown) for timing a steaming time. The steaming time may, for instance, be displayed via the user interface 110 such that the user may monitor the progress of the steaming. The controller 112 may control the steaming time, i.e. as timed using the timer, so as to control the steam amount. In other words, the timer can provide an input to the controller 112 such that the steaming time can be controlled.

The controller 112 may control the steam parameter and/or the liquid amount in response to the indication provided by the weight sensor 114. As the steaming progresses, more condensed water may collect in the chamber 102. This condensed water may influence the texture of the food puree since the pureeing may be carried out using the steamed food ingredients together with this water. Determining the amount of moisture added to the food ingredients during steaming may be more accurately determined using the weight sensor 114 than, for instance, using the steaming time alone. This is because the collecting of condensed water in the chamber 102 during steaming may depend on a number of variables, such as food type, weight etc., as well as the amount of steam which may, for instance, escape from the apparatus 100 via the steam exits (not shown).

The controller 112 may be configured to determine the difference between the respective weights of the food ingredients before and after steaming thereby to provide a more reliable estimation of the liquid amount required to be added to the food ingredients in order to attain the requisite texture. In this manner, the weight sensor 114 may permit the controller 112 to exercise a greater degree of control over the texture of the food puree.

Factors, i.e. steam parameters, such as the steaming time may be critical in terms of achieving the desired degree of cooking of the food ingredients. Different food ingredients tend to require different steaming times in order to be cooked to the desired taste and texture, i.e. before pureeing.

Moreover, the steam amount is a key factor in determining the texture of the food puree given that the steam amount may dictate the content of condensed water present in the chamber 102 following steaming of the food ingredients.

The controller 112 may, for instance, estimate the quantity of water condensate added to the chamber 102 during steaming based on the required temperature increase of the food ingredients contained in the chamber 102. This estimation may, for example, be carried out using Equations 1 and 2.

$$Q = m_p \cdot c_p \cdot \Delta T \cdot \text{eff} \qquad \text{Equation 1}$$

$$Q = l_g \cdot m_s \qquad \text{Equation 2}$$

where: $m_p$ is the weight of the food ingredients being heated; $m_s$ is the mass of the steam; $c_p$ is the heat capacity of the food ingredients; $l_g$ is the latent heat of vaporization of water; $\Delta T$ is the temperature change of the product; eff is the efficiency of the heating process; Q is the heat energy. Combining Equations 1 and 2 and rearranging gives Equation 3:

$$m_s = (m_p \cdot c_p \cdot \Delta T \cdot \text{eff})/l_g \qquad \text{Equation 3}$$

Thus the mass of steam, and thus the mass of water supplied to the chamber 102 may be estimated by the controller 112. The parameter $m_p$ may, for instance, be estimated by the user and inputted using the user interface 110. Alternatively, $m_p$ may be measured using the weight sensor 114, which may be included in the apparatus 100. The parameter $c_p$ may be inputted by the user via the user interface 110, e.g. by specifying a food type; the controller 112 comprising pre-set $c_p$ values for different food ingredients. $\Delta T$ may similarly depend on the food type since the temperature change required to effect cooking, i.e. the requisite softening, of the food ingredients will depend on the nature of the food ingredients. Accordingly, $\Delta T$ may also, for example, be inputted by the user using the user interface 110. Alternatively, $\Delta T$ may be pre-set in the controller 112 for different food ingredients which may be selected by the user. The parameter eff may be a value which is intrinsic to the apparatus 100 and which may also be pre-set in the controller 112. The eff value may also account for the escape of steam from the chamber 102 via the abovementioned steam exits (not shown).

The controller 112 determines a liquid amount to be supplied by the liquid supply 106 to the chamber 102 according to the received data from the user interface 110. The controller 112 further controls the liquid supply 106 according to the determined liquid amount, i.e. in addition to controlling the steam supply 104 according to the determined steam parameter.

In this manner, both the steam supply 104 and the liquid supply 106 are controlled by the controller 112 according to the user selection of the texture of the food puree. In a scenario where a smoother food puree is desired, conventional cooking apparatuses may simply supply more steam, i.e. by using a prolonged steaming time, to the food ingredients thus relying on a longer heating time, as well as a greater condensed water content following steaming to achieve the requisite smooth texture. The present apparatus 100 controls both the steam supply 104 and the liquid supply 106 thereby to obviate such prolonged steaming such that less nutrient-stripping from the food ingredients may occur, as previously described.

Control over both the steam supply 104 and a liquid supply 106 has further advantages in terms of controlling the texture of the food puree prepared from different food ingredients. Shorter or longer cooking/steaming times will be required depending on the type of food ingredient(s). In this regard, the user interface 110 may, for instance, permit the user to input a food descriptor such that the cooking conditions are appropriate for the food ingredients being steamed, as previously described.

A relatively short steaming time for some foods, i.e. food ingredients requiring minimal heating in order to become suitably softened, may necessitate addition of more liquid in order to attain the desired smoothness than if the cooking requirements dictate a longer steaming time in which more moisture will be concomitantly added to the food ingredients. Equally a relatively long steaming time, i.e. for food ingredients requiring more prolonged heating in order to become suitably softened, may mean that less additional liquid is required. The controller 112 may therefore control the liquid amount according to the steam amount supplied during steaming, e.g. according to the steaming time. In this manner, the controller 112 may control the steam supply 104 and the liquid supply 106 in order to achieve optimal cooking of the food ingredients, as well as the requisite texture of the food puree.

The liquid amount supplied to the chamber 102 by the liquid supply 106 is controlled by the controller 112, as indicated by the arrow between the respective blocks corresponding to the controller 112 and the liquid supply 106 in FIG. 2. This may be achieved, for example, by the controller 112 sending a control signal to a pump (not shown) which is arranged to pump the liquid to the chamber 102, e.g. from the liquid reservoir 120. Other means of controlling the liquid amount supplied by the liquid supply 106, e.g. using a suitable control valve, will also be immediately apparent to the skilled person.

In an embodiment, the controller 112 may control the agitator 108 according to the received data from the user interface 110. The mechanical breakdown of the food ingredients by the agitator 108 may influence the texture of the resulting food puree. Thus by the controller 112 further controlling the agitator 108 according to the puree texture requirement inputted by the user, the capability of the apparatus 100 to tailor the texture of the food puree according to the requirements of the consumer of the food puree may be enhanced.

The agitator 108 may comprise a rotor 116 and the controller 112 may be adapted to control the rotational speed of the rotor 116 according to the received data. The greater the rotational speed of the rotor 116, the smoother the texture of the puree will tend to be. Thus by the controller 112 controlling the rotational speed of the rotor 116, the controller 112 may exercise a greater degree of control over the texture of the food puree. Further means of controlling the agitator 108 in order to attain the desired texture of the food puree, such as by pulsing the rotation of the rotor 116 will be immediately apparent to the skilled person.

Figure 3:
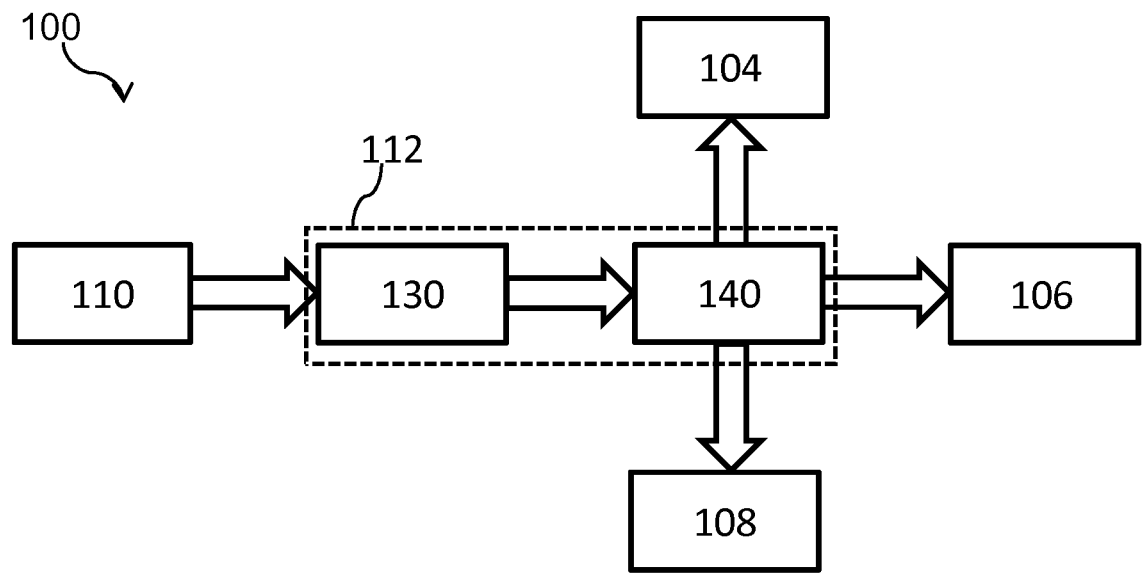
FIG. 3 shows a block diagram of an apparatus according to a further embodiment.

FIG. 3 depicts a further block diagram of the apparatus 100 according to an embodiment. The controller 112 comprises a database module 130 and a control module 140. The database module 130 may have a database of pre-stored data which correlate the texture requirement, which is inputted by the user via the user interface 110, with the steam parameter and the liquid amount. For instance, a smooth texture requirement may correspond to a higher liquid amount and, e.g. in the case of food ingredients which require more prolonged cooking in order to attain the requisite taste and texture, a longer steaming time. A coarser texture requirement may, for instance, correlate with a lower liquid amount and, depending on the food ingredients, a shorter steaming time.

As described above in relation to the user interface 110, user input of a food descriptor such as a type, shape, size, and weight of the food ingredients may further assist to attain the desired texture of the food puree. Accordingly, such food descriptors may be included in the pre-stored data in terms of the texture requirement.

The pre-stored data may be determined by experiments in a similar way as illustrated in the following in connection with FIG. 6 and FIG. 7.

The control module 140 may determine the steam parameter and the liquid amount according to the pre-stored data. The control module 140 may then send respective control signals to the steam supply 104 and the liquid supply 106 according to the determined steam parameter and liquid amount. The control module 140 may, for instance, also send an agitator control signal to the agitator 108 in order to attain the desired texture of the food puree, as previously described.

As discussed above, embodiments make use of the controller 112 for controlling components of the apparatus 100. The controller 112 can be implemented in numerous ways, with software and/or hardware, to perform the various functions required. A processor is one example of a controller which employs one or more microprocessors that may be programmed using software (e.g. microcode) to perform the required functions. A controller may however be implemented with or without employing a processor, and also may be implemented as a combination of dedicated hardware to perform some functions and a processor (e.g. one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Figure 4:
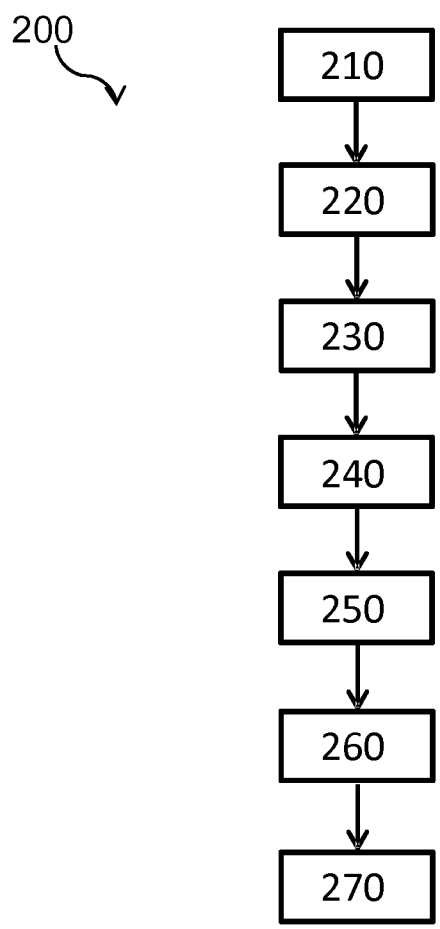
FIG. 4 shows a flowchart of a method according to an embodiment.

FIG. 4 shows a flowchart of a method 200 of preparing food puree according to an embodiment. The method 200 commences in step 210. Step 210 may, for example, correspond to receiving food ingredients intended for preparation of the food puree, i.e. in a chamber 102. In step 220, data is received relating to a texture requirement of the food puree. This may be achieved via a user interface 110, as previously described in relation to the apparatus 100. In step 230, a steam parameter and a liquid amount are determined according to the received data. Steam is then supplied to a chamber 102 containing the food ingredients according to the determined steam parameter in step 240. Similarly, in step 250 liquid is supplied to the chamber 102 according to the determined liquid amount. The steamed food ingredients are pureed in step 260 in the presence of the liquid amount. The method 200 terminates in step 270.

In an embodiment, the supplying of the liquid in step 250 involves adding the liquid to the chamber 102 which already contains condensed water from the steam which is supplied during step 240. It will therefore be evident that the control over the overall liquid content of the food ingredients, which is key in determining the texture of the food puree, is achieved by controlling both the water condensate content of the steamed food ingredients and the liquid amount.

Whilst in FIG. 4, step 250 is carried out following step 240, this is not intended to be limiting. It is also conceivable that the liquid amount may be added before the steaming step 240. In such a scenario, a predicted amount of water condensate added during the steaming step 240, e.g. estimated using Equation 3 as described above, may dictate the liquid amount added in step 250.

Figure 5:
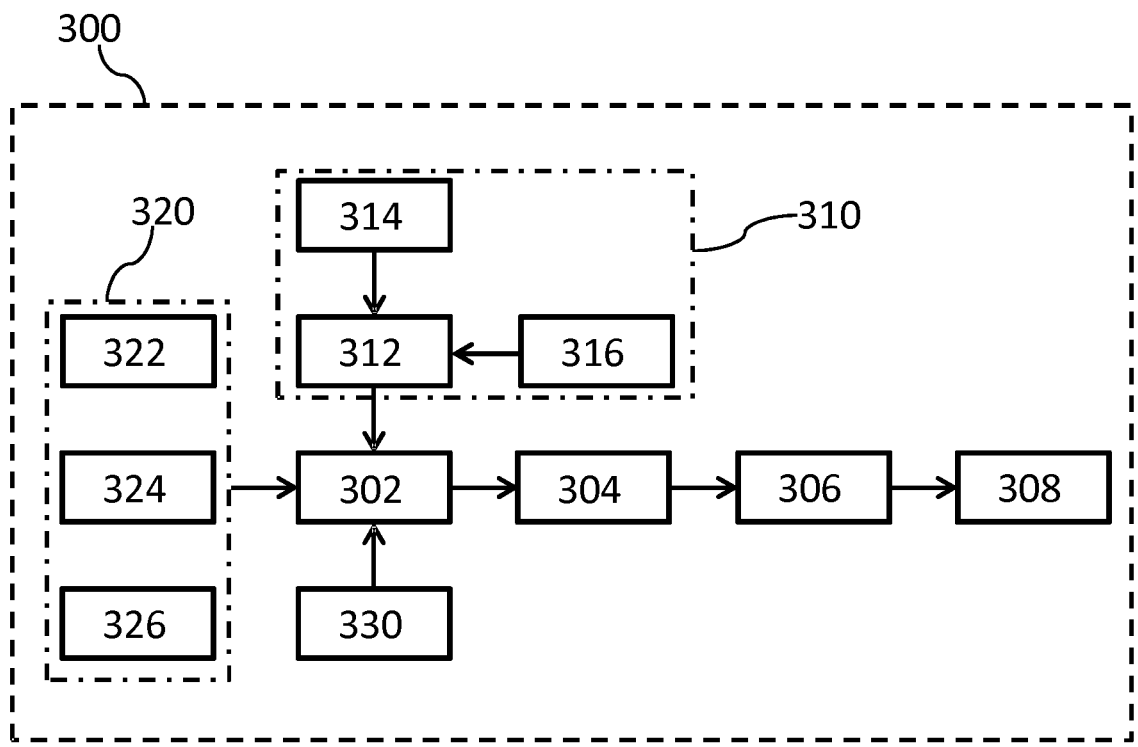
FIG. 5 shows a flowchart of a puree preparation routine according to a further embodiment.

Turning to FIG. 5, a flowchart of a puree preparation routine 300 which may, for instance, be implemented by the apparatus 100 is shown. In block 302, a cooking program determination is made based on inputs relating to consumer personal requirements 310 and food information 320. Information from a cooking program database 330 further informs the cooking program determination 302.

The consumer personal requirements 310 may, for instance, be infant requirements. Accordingly, the puree texture determination 312 may be based on infant age data 314, as well as food texture guidelines according to infant age 316. The food information 320 may comprise food type 322, food shape 324, and food weight 326 inputs.

Following the determination of the cooking program 302, liquid may be added automatically to the food ingredients 304, i.e. via steaming and liquid addition, as previously described. Blending 306 of the food ingredients in the presence of the added liquid is then implemented. The puree preparation routine 300 terminates in step 308.

The advantages of the present invention were demonstrated experimentally. Broccoli samples were steamed using the Philips AVENT baby food maker. Broccoli was cut into ca. 4×4×1 cm pieces, and 200 g portions of the broccoli pieces were steamed for different steaming times: 0 minutes, 5 minutes, 10 minutes, 15 minutes and 20 minutes.

The hardness of the broccoli samples was measured at each of these steaming times using a lab texture analyzer (TA-XT plus). A P/2 probe and testing platform arrangement was employed for the hardness determination. The settings used were as follows: Test Mode: Compression; Pre-Test Speed: 2.00 mm/sec; Test Speed: 1.00 mm/sec; Post-Test Speed: 2.00 mm/sec; Target Mode: Distance; Distance: 8.0 mm; Trigger Type: Auto (Force); Trigger Force: 5.0 g; Advanced Options: off. Before measurement of the samples, a calibration program was run on the lab texture analyzer using the test surface of the texture analyzer. The return distance was specified as 30 mm for the calibration.

The texture analyzer was employed to record the force-time profile during compression of the broccoli sample. The hardness of the surface of the broccoli was indicated by the force measured at the moment the broccoli sample is punctured by the probe. In practice, this moment is recognizable by the texture analyzer program by the first peak force after a pre-set threshold, which is a food-dependent empirical value and can be fine-tuned with accumulated data points.

Both the hardness of the skin and the hardness of the inner portions of the broccoli samples were determined using this set-up. The inside hardness was calculated as the average force when the probe moves inside the broccoli, and was derived from the calculated distance between the top and bottom surfaces of the broccoli. A calculated distance of 4-6 mm was employed in this test (the thickness of the broccoli samples after cutting was ca. 10 mm). 5 g was set as an initial threshold for this measurement.

Following removal from the steaming chamber, the broccoli samples were cut exposing a plane of the cooked broccoli. The distance between the uncut side to the plane was around 1 cm. The cut broccoli sample was then placed on the testing platform such that the plane contacted the surface of the testing platform. The position of the broccoli sample was adjusted such that the caudex of the broccoli sample was positioned directly under the testing probe. The measurement program was then started and the measurement was repeated using two further portions of the broccoli sample. The mean and RSD of the three measurements were calculated. The results are shown graphically in FIG. 6. The plot corresponding to the skin hardness is denoted by reference numeral 600, and the plot corresponding to the inner hardness is denoted by the reference number 601.

Figure 6:
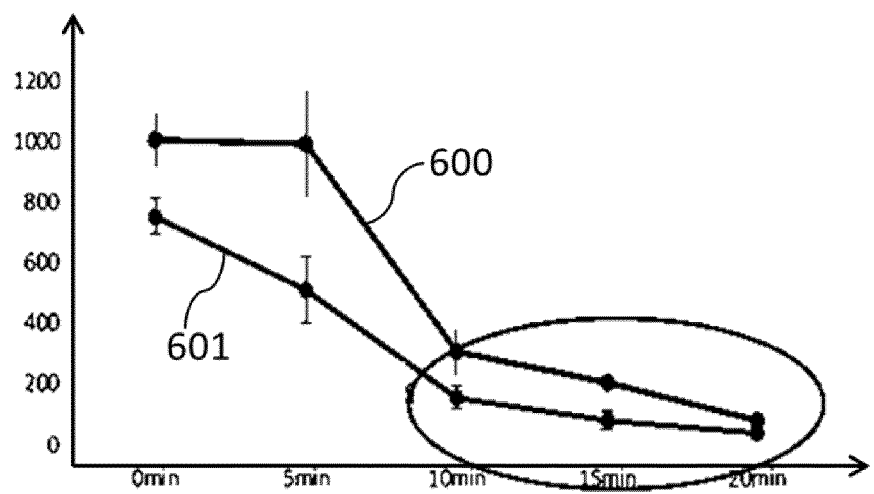
FIG. 6 shows a graph plotting the variation in hardness (y-axis) of the skin and the inner portions of broccoli samples with steaming time (minutes; x-axis)

FIG. 6 shows that steaming for longer than 10 minutes does not result in significantly greater softening of the broccoli. Thus steaming for 10 minutes may be sufficient to effect cooking of the broccoli; further steaming only resulting in unwanted stripping of nutrients from the broccoli. However, more prolonged steaming may mean that the steaming chamber acquires a greater quantity of condensed water which may assist in blending of the broccoli to a smooth texture, as previously described. This was demonstrated in a further experiment.

In this further experiment, the increase in the quantity of condensed water with steaming time was investigated. The broccoli samples were weighed (Wf0) before being placed in the steaming chamber. The total weight of the steaming chamber+broccoli (Wt0) was also measured. Following steaming of the broccoli samples for the different steaming times, the total weight of the steaming chamber+steamed broccoli (Wt1) was measured once again. The steamed broccoli sample was also removed from the steaming chamber and weighed (Wf1). The units of weight (y-axis) in FIG. 7 are grams (g).

Figure 7:
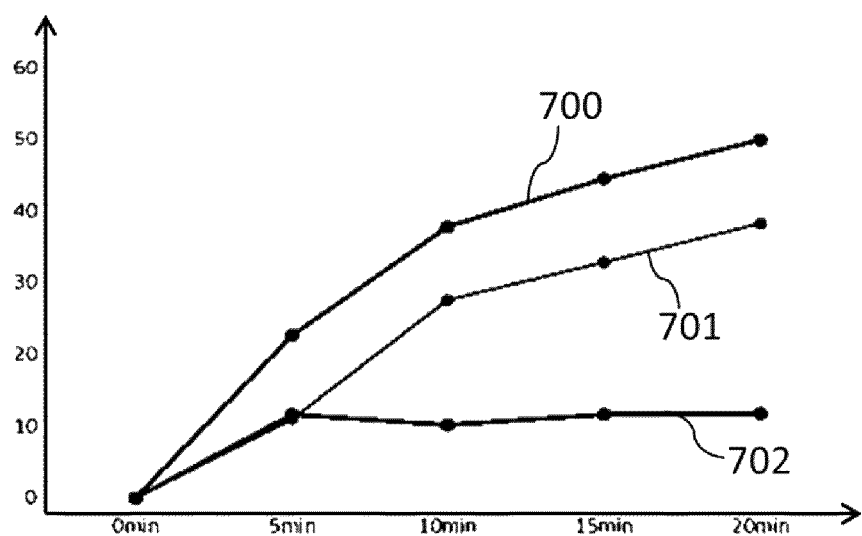
FIG. 7 shows a graph plotting the increase in weight (grams; y-axis) of broccoli samples, the steaming chamber, and the total gained weight of the broccoli sample+steaming chamber with steaming time (minutes; x-axis).

The total gained weight 700 as shown in the graph in FIG. 7 is equal to Wt1−Wt0. The gained free water weight 701 shown in this graph equals Wt1−Wf1. The gained sample weight 702 equals Wf1−Wf0. It is evident from FIG. 7 that the broccoli sample itself does not substantially gain moisture content in the period which follows the first 5 minutes of steaming. On the other hand, more prolonged steaming causes more moisture, i.e. water condensate, to collect in the steaming chamber as demonstrated by the increase in free water weight 701.

Hence, a smoother puree may be achieved by more prolonged steaming, since more water condensate will collect in the steaming chamber. However, FIG. 6 demonstrates that prolonged steaming may not be necessary to effect adequate cooking of the food ingredients, in this case broccoli; such longer steaming times only causing depletion of the nutrients of the food ingredients. It is for this reason that the present invention proposes to add additional liquid to the steamed food ingredients in order to attain a smoother texture without resorting to prolonged steaming times.

In this regard, the inventors have found that a puree obtained by steaming a broccoli sample for 10 minutes and adding 20 g of extra water before blending has a similarly smooth texture with respect to a further puree obtained by steaming another broccoli sample for 20 minutes without adding additional water before blending. The blending conditions were the same for both purees. The former puree retains more nutrients than the latter owing to the shorter steaming time.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for preparing a food puree comprising:
a chamber for containing food ingredients;
a steam supply for supplying steam to the chamber for steaming the food ingredients;
a liquid supply for supplying a liquid to the chamber, in addition to condensed liquid collectable in the chamber from the steaming of the food ingredients;
an agitator for pureeing the steamed food ingredients in the liquid to obtain said food puree;
a user interface adapted to receive data related to a texture requirement of said food puree; and
a controller adapted to determine, according to said received data, at least one steam parameter based on which the steam is to be supplied to the chamber and a liquid amount to be supplied by the liquid supply to the chamber, taking into account the condensed liquid, and to control the steam supply and the liquid supply according to the determined at least one steam parameter and the determined liquid amount while preparing the food puree.

2. The apparatus of claim 1, wherein the at least one steam parameter comprises a steam amount.

3. The apparatus of claim 1, further comprising a timer, wherein the at least one steam parameter comprises a steaming time.

4. The apparatus of claim 1, further comprising a weight sensor adapted to provide an indication of an increase in weight of the food ingredients during or following said steaming, wherein the controller determines the liquid amount supplied by the liquid supply, taking into account the condensed liquid, in response to said indication.

5. The apparatus of claim 1, wherein the agitator comprises a rotor, the controller being adapted to control a rotational speed of the rotor according to said received data.

6. The apparatus of claim 1, wherein the chamber comprises a perforate wall portion having at least one aperture, said perforate wall portion being coupled to the steam supply such that the steam enters the chamber via said at least one aperture.

7. The apparatus of claim 1, wherein the steam supply comprises a one way valve through which steam is supplied into the chamber.

8. The apparatus of claim 1, wherein the liquid supply comprises a liquid reservoir for storing said liquid.

9. The apparatus of claim 8, wherein the liquid supply comprises a pump, the controller being adapted to control the pump to pump said liquid amount from the liquid reservoir to the chamber.

10. The apparatus of claim 8, comprising a heating element arranged to heat the liquid in the liquid reservoir according to the determined at least one steam parameter such that steam is generated when said liquid comprises water, the liquid reservoir having a steam outlet which couples to said steam supply.

11. The apparatus of claim 1, wherein the controller comprises:
 a database of pre-stored data correlating the at least one steam parameter, the liquid amount and the texture requirement; and
 a processor adapted to determine the at least one steam parameter and the liquid amount according to the pre-stored data.

12. The apparatus of claim 1, wherein the data related to a texture requirement comprises at least one of:
 a texture descriptor; or
 an age of a food puree consumer.

13. The apparatus of claim 1, wherein the controller is further adapted to determine the at least one steam parameter and the liquid amount according to at least one food descriptor, wherein the at least one food descriptor defines at least one of a food type, a food shape, a food size, or a food weight, the user interface being further adapted to receive data related to said at least one food descriptor.

14. The apparatus of claim 1, further comprising:
 a reservoir for containing the liquid; and
 a heater for heating the liquid in the reservoir to generate the steam.

15. The apparatus of claim 14, wherein the at least one steam parameter comprises a power supplied to the heater to adjust a quantity of the steam from the steam supply.

16. The apparatus of claim 14, wherein the liquid supplied to the chamber by the liquid supply is warmed by residual heat following the generating of the steam, such that supplying the liquid to the chamber avoids rapid cooling of the steamed food ingredients.

17. The apparatus of claim 3, wherein the controller determines a higher value of the liquid amount to be supplied by the liquid supply to attain a desired smoothness in response to a shorter steaming time, and a lower value of the liquid amount to be supplied by the liquid supply to attain the desired smoothness in response to a longer steaming time.

18. An apparatus for preparing a food puree comprising:
 a chamber configured to contain food ingredients;
 a liquid reservoir configured to contain a liquid;
 a heater configured to heat the liquid in the liquid reservoir to generate steam;
 a steam supply configured to supply the steam to the chamber for steaming the food ingredients;
 a liquid supply configured to supply a portion of the liquid from the liquid reservoir to the chamber;
 an agitator configured to puree the steamed food ingredients in the liquid to obtain said food puree; and
 a controller configured to determine, according to a texture requirement of the food puree, a steam parameter based on which the steam is to be supplied by the steam supply to the chamber and a liquid amount to be supplied by the liquid supply to the chamber, taking into account condensed water collectable in the chamber from the steaming of the food ingredients, and to control the steam supply and the liquid supply according to the determined at least one steam parameter and the determined liquid amount.

* * * * *